United States Patent [19]

Lombana et al.

[11] 4,347,156
[45] Aug. 31, 1982

[54] SYSTEM AND PROCESS FOR REACTIVATING CARBON

[75] Inventors: Luis A. Lombana, Belmont; Daniel E. Myers, Palo Alto, both of Calif.; Orris E. Albertson, Salt Lake City, Utah

[73] Assignee: Lurgi Corporation, Belmont, Calif.

[21] Appl. No.: 233,337

[22] Filed: Feb. 11, 1981

Related U.S. Application Data

[63] Continuation of Ser. No. 26,485, Apr. 2, 1979, abandoned.

[51] Int. Cl.³ .................... B01J 20/34; C01B 31/10; F23G 5/04; F26B 17/12
[52] U.S. Cl. .................................. 252/420; 34/168; 110/225; 252/418
[58] Field of Search ........... 252/418, 416, 420, 411 R; 432/14, 18, 23, 72, 90, 112, 117; 34/168; 110/225, 346

[56] References Cited

U.S. PATENT DOCUMENTS

| | | | |
|---|---|---|---|
| 2,616,858 | 11/1952 | Gillette et al. | 252/418 |
| 2,851,428 | 9/1958 | Wayne et al. | 252/417 |
| 3,153,633 | 10/1964 | Von Dreusche, Jr. | 252/418 |
| 4,008,994 | 2/1977 | Numasaki et al. | 34/168 |
| 4,115,317 | 9/1978 | Spater | 252/418 |

FOREIGN PATENT DOCUMENTS 50-86495  7/1975  Japan ................................. 252/420

Primary Examiner—P. E. Konopka
Attorney, Agent, or Firm—Flehr, Hohbach, Test, Albritton & Herbert

[57] ABSTRACT

There is provided a system for reactivating wet, spent carbon including a drying device to heat the carbon to drive moisture from the carbon as steam. A multiple-hearth furnace receives the carbon from the drying device, and the carbon is baked and reactivated therein. Reactivation is accomplished in the presence of steam, at least part of which is the steam which had been driven from the wet, spent carbon.

5 Claims, 3 Drawing Figures

SYSTEM AND PROCESS FOR REACTIVATING CARBON

This is a continuation, of application Ser. No. 026,485 filed Apr. 2, 1979, now abandoned.

BACKGROUND OF THE INVENTION

1. Field of the Invention

This invention relates to a method and system for regenerating spent activated carbon to remove materials adsorbed on the activated carbon.

2. State of the Art

Generally speaking, activated carbon comprises particles of carbon which have been treated so that they are able to adsorb organic materials. It is well-known that activated carbon can be used to remove certain organic chemicals from liquid and gases. For example, activated carbon can be used to reduce pollution in certain types of wastewaters and to decolorize sugar liquors and the like. In a conventional wastewater treatment system utilizing activated carbon the wastewater is passed through a vessel filled with granules of the carbon, and pollutants are removed from the water by adsorbtion on the carbon.

After a period of use, the activated carbon becomes saturated with pollutants and thus "spent" and must be regenerated before it can be further used effectively. Conventional means for regeneration include thermal treatment of the spent carbon. In particular one patented thermal regeneration process involves the steps of drying, heating and burning. According to the thermal regeneration process taught in U.S. Pat. No. 3,153,633 to Von Dreusche, Jr. spent activated carbon is fed to a furnace of the multiple-hearth type, and dried and regnerated therein.

According to the patent, in the multiple-hearth furnace the wet, spent activated carbon is first heated in the upper part of the furnace to drive off moisture. The moisture and gases are removed from the furnace and part are discharged to the atmosphere while the remainder are transferred to the lower part of the furnace. The carbon moves downward and is heated in the lower part of the furnace by burning fuel therein. Air is introduced into the lower part of the furnace to promote combustion.

It should thus be understood that in the above-identified patented system substantial quantities of moisture are heated and driven from the carbon and then discharged to the atmosphere. It should also be understood that air contains a substantial percentage of inert gases such as nitrogen. Therefore the gases cycled from the upper to the lower part of the furnace contain a substantial quantity of inert gas.

SUMMARY AND OBJECTS OF THE INVENTION

The present system includes means to dry wet spent activated carbon by the addition of heat to drive the water off as water vapor. The dried carbon is then transferred to a carbon regeneration means such as a multiple-hearth furnace for regeneration therein. The multiple-hearth furnace comprises a vertically disposed cylindrical container having an inlet port in its upper end and an outlet port in the lower end. A plurality of horizontally disposed hearths are located within the cylindrical container, and a plurality of rabble arms are affixed to a rotating center column so that they move above each of the hearths. Spent activated carbon is introduced into the inlet port to fall onto the uppermost hearth, and the rotating rabble arms rake the carbon over the upper hearth to fall therefrom to the subsequent lower hearths.

The uppermost hearths comprise a drying zone wherein the carbon is heated to drive off any remaining moisture. The carbon then falls to the next lower hearths which form a baking zone wherein the spent activated carbon is heated to about 1300° F. The water and adsorbed organic materials driven from the carbon exit with products of combustion from a port in the upper end of the furnace. The hot carbon then moves to subsequent lower hearths comprising an activation zone. In the activation zone, the carbon is heated to about 1700° F., and hot water vapor is introduced to reactivate the carbon. According to the present invention at least part of this water vapor is from the drying device. After reactivation the activated carbon is removed from the lowest hearth in the furnace and transferred to a tank of water for quenching.

The gases leaving the furnace via the exhaust gas port are transported to an afterburner wherein the gases burn at about 1400° F. This burning insures that the volatile impurities driven from the carbon are destroyed thereby preventing odorous gases from leaving the system. The hot gases leaving the afterburner are transferred to the drying means to provide heat to dry the carbon. The water vapor which evolves from the spent activated carbon in the drying means is transferred to the lower hearths of the multiple-hearth furnace to provide the water vapor for reactivation.

Thus, it can be appreciated that an object of the present invention is to provide a process and system whereby the water vapor evolved from the drying of spent activated carbon is utilized to reactivate the carbon. An additional object of the present invention is to utilize the heat in the hot gases from an afterburner to dry spent activated carbon.

Another object is to dry the wet spent carbon with hot gases without mixing the carbon and the hot gases. Thereby the water vapor from the wet carbon is not mixed with substantial quantities of inert gas, and the inert gas need not be recycled.

Further objects of the present invention may be readily determined by reference to the following description and appended drawings, which are offered by way of example only and not in limitation of the invention, the scope of which is defined by the appended claims and equivalents to the structure, materials and acts set forth hereinafter.

DETAILED DESCRIPTION OF THE PREFERRED EMBODIMENT

Figure 1:
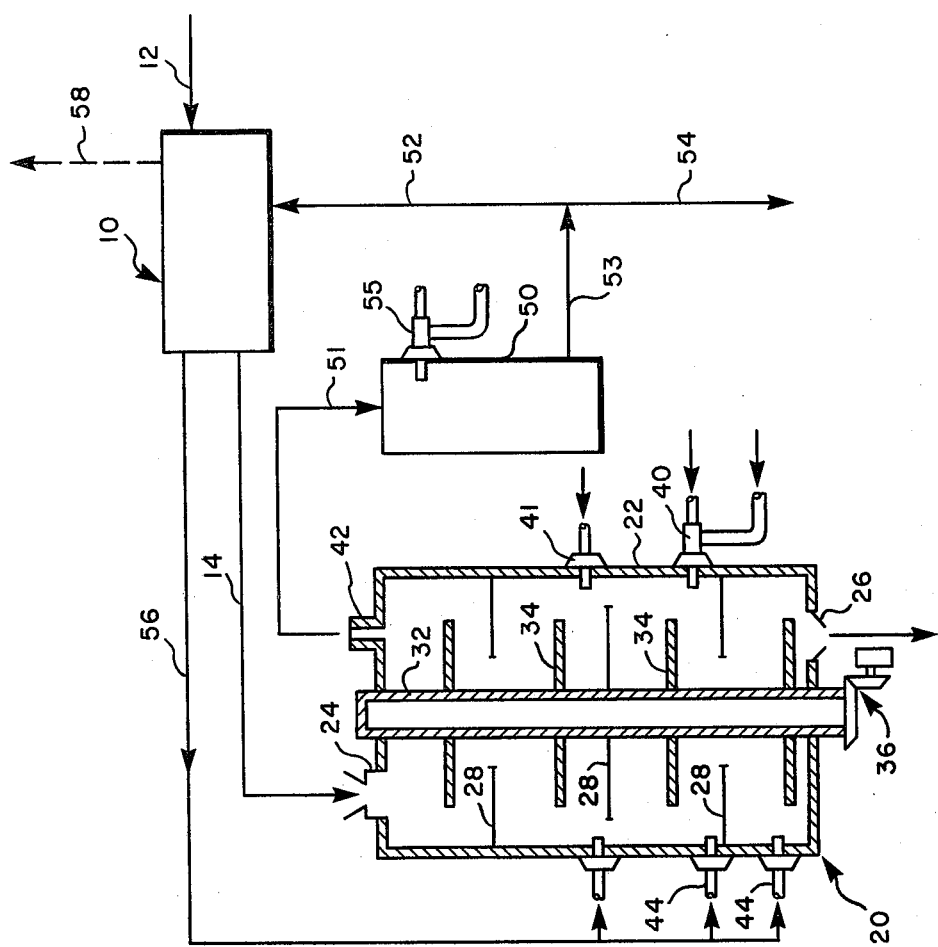
FIG. 1 is a schematic illustration of the preferred embodiment of the present system.

The spent carbon regeneration system shown in FIG. 1 includes a thermal drying means 10. The thermal drying means 10 is a conventional device such as a thermal screw, rotary dryer or like means for drying spent activated carbon by passing hot fluid through coils which are in contact with the carbon thereby to vaporize hot water vapor from the carbon. Coupled to the inlet end of the drying means 10 is a line 12 for introducing carbon thereinto, and coupled to the outlet end is a line 14 for removing dried, spent carbon. The line 14 is coupled to a multiple-hearth furnace 20 wherein the carbon is regenerated.

The multiple-hearth furnace 20 includes a substantially closed, vertically disposed refractory lined cylindrical vessel 22. An inlet port 24 is located in the upper end of the cylindrical vessel to receive spent activated carbon, and an outlet port 26 is formed in the bottom end of the vessel for removal of regenerated carbon. A plurality of horizontally disposed hearths 28 are formed inside the vessel 22 and spaced apart from one another so that a body of activated carbon can be located in the hearth spaces atop each of the hearths 28. A vertical center column 32 is located along the central axis of the vessel 22 and is coupled to a drive means 36 for rotation. A plurality of horizontally disposed rabble arms 34 are connected to the center column 32 to rotate therewith and travel above the hearths 28. The uppermost hearth is affixed to the inside of the furnace 20 and spaced apart from the center column 32 a substantial distance, while the next lower hearth is spaced apart from the center column 32 only a short distance and has a plurality of ports formed around its periphery. Successively alternating lower hearths are the same construction as the first two hearths. Thus as the rabble arms rotate they rake carbon across each hearth so that it falls from hearth to hearth in a generally serpentine path, and thence outward through outlet port 26.

Coupled to the vessel 22 are a plurality of air inlet conduits 41 and burners 40. The air inlet conduits 41 are connected to a blower, not shown, to introduce controllable quantities of air into selected hearth spaces to permit burning. A plurality of conduits 41 are located around the periphery of each selected hearth space. Burners 40 are located at selected hearth spaces and include means for introducing a mixture of a fuel, such as natural gas, and air into the furnace for burning to maintain a predetermined temperature in the furnace. Also coupled to the vessel 22 are a plurality of water vapor inlet pipes 44. It should be appreciated that the air inlet pipes 41, burners 40 and water vapor inlet pipes 44 illustrated in FIG. 1 can be located in other locations that shown in FIG. 1 depending upon the particular design of the furnace.

A gas outlet port 42 is coupled to the upper end of the multiple-hearth furnace 20 for removing hot gases from the furnace, and an afterburner 50 is coupled by a line 51 to the outlet gas port 42. The afterburner 50 is a conventional device for burning combustible gases and includes a burner 55. Although the illustrated afterburner 50 is separate from the furnace 20, in certain applications the afterburner 50 can be formed as the uppermost hearth space of the furnace.

Hot gases leaving the afterburner 50 are carried by line 53 to lines 52 and 54. Damper means, not shown, are located in lines 52 and 54 so that the flow of hot gas from line 53 can be directed either into line 52 or line 54, or partly into both lines. Line 54 is coupled to a conventional means, not shown, to remove particulate material from the gas before the gas is discharged to the atmosphere. Line 52 is coupled to the drying means 10 to convey hot gas through the drying means to heat the spent carbon therein.

It should be appreciated that the drying means 10 can be either of the direct contact, or noncontact type. In the direct contact type hot gases entering the drying means via line 52 come into contact with the spent carbon, and the gases and water vapor evolved from the spent carbon as well as the hot gases introduced via line 52 are exhausted from the drying means 10 via line 56. In the non-contact system, on the other hand, the hot gases from line 52 travel through coils or the like located within the drying means 10, and exit the drying means via line 58. Thus the spent carbon is heated but does not contact the gases from line 52, and the gases leaving drying means 10 via line 56 are only those evolved from the spent carbon. It should be understood that the gases leaving the afterburner are inert, i.e., not combustible. Therefore in the non-contact system the inert gases are not mixed with water vapor evolved from the wet carbon and the quantity of gas transferred to the furnace to be introduced via lines 44 is minimized. Line 56 is coupled to the water vapor inlet pipe 44 to convey the vapor and other gases from the drying means 10. Gases from line 58 are transferred to a conventional particulate removal means, not shown.

In operation of the system illustrated in FIG. 1, spent carbon containing about 50% water is introduced into the drying means 10 via line 12. Hot gases are introduced into the drying means via line 52 to heat the spent carbon and drive water vapor therefrom, and the dried spent carbon, containing about 1%–20% water, is carried by line 14 into the multiple-hearth furnace 20. In the multiple hearth furnace the carbon is heated to drive off any remaining moisture. Then the spent carbon is baked in the baking zone on the upper hearths 28 of the furnace, and in this baking step, the temperature of the spent carbon is raised to about 1300° F. by burning fuel in the burners 40.

The carbon is continuously raked across the upper hearths and falls to successively lower hearths comprising the reactivation zone wherein reactivation takes place. In the reactivation zone the temperature of the carbon is raised to about 1600° F. to 1900° F. and water vapor is controllably introduced via line 56.

The water vapor for reactivation is derived from heating moist spent carbon in the drying means 10. If the drying means 10 is of the direct contact type, hot gases from line 52 pass through the dryer 10 and return to the furnace via line 56. However, if a non-contact type drying means is employed, gas from line 52 exits the dryer 10 via line 58. Therefore only water vapor and other gases evolved from the spent carbon flow to the furnace and inert gases in the gas from the furnace are not recycled. In certain applications this advantageously results in reducing the volume of gas which must be recycled, as compared to the direct-contact type dryer system discussed above. If sufficient water vapor is not derived from the spent carbon, hot water vapor can optionally be generated in a boiler, not shown, and introduced via inlet pipes to supplement the steam from line 56.

After the carbon has been reactivated it is discharged through outlet port 26 and quenched with water. Thereafter the activated carbon can be reused.

During the reactivating process volatile organic materials which had been adsorbed by the carbon are removed therefrom. These volatile materials are at least partly burned in the multiple-hearth furnace, and the remainder leave via gas outlet port 42 to be conveyed via line 51 to the afterburner 50. In the afterburner 50 the temperature is increased to about 1400° F.–2000° F. to insure that all the volatile organic materials are burned and no offensive odors are present in the resulting gas which leaves the afterburner via line 53. If necessary for complete combustion, the burner 55 can be operated. From line 53 the afterburned exhaust gases can be directed either to the drying means 10 via line 52 to heat the carbon, or to further treatment to remove particulate material and thence exhaust via line 54. Thus it can be appreciated that substantial quantities of heat are present in the gases leaving the afterburner, and this heat is advantageously utilized to dry the moist carbon in the drying means 10.

Figure 2:
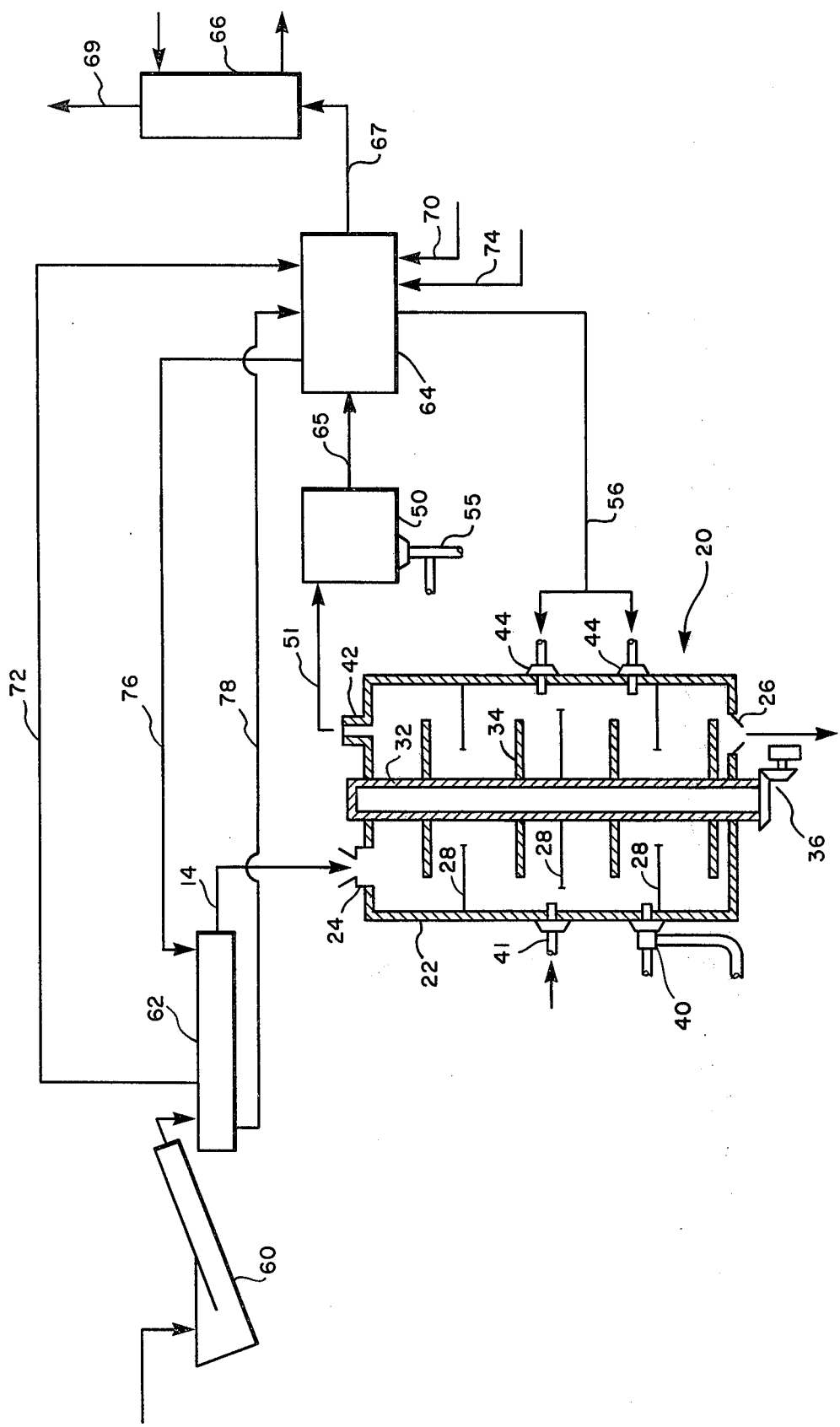
FIG. 2 is a schematic illustration of another embodiment of the present system.

Turning to the system illustrated in FIG. 2, this system includes many of the same elements as the system illustrated in FIG. 1, and these common elements are indicated by the same reference numbers.

In addition to the elements which are common to the FIG. 1 system, the FIG. 2 system includes a rotary dewatering screw 60 or like dewatering means for receiving spent carbon and mechanically removing water therefrom. From the rotary screw 60, the spent carbon is transferred to a thermal screw 62 or the like wherein the carbon is heated by non-contact means to drive off water vapor. The thermal screw 62 is a conventional means to heat material by indirect heat exchange with hot fluid flowing through coils or the like. From the thermal screw 62 the dried carbon is transferred to the inlet port 24 of the multiple-hearth furnace 20 via line 14.

According to the FIG. 2 embodiment, the multiple-hearth furnace 20 and the afterburner 50 are constructed and operated the same as those shown in the FIG. 1 embodiment. The gases from the afterburner 50 are conveyed to a boiler 64 via line 65. The boiler 64 has a means to burn fuel introduced by line 70 and to thereby heat liquid and gas. In particular, the boiler 64 heats a stream of fluid, preferably oil, which is removed from the boiler via line 76 and conveyed to the coils of the thermal screw 62 to heat the carbon therein. This stream of fluid is then conveyed from the thermal screw 62 back to the boiler via line 78 to be reheated. Also coupled to the boiler 64 is a line 72 which conveys water vapor from the thermal screw 62. The water vapor is heated in the boiler 64 before introduction into the reactivating section of the multiple-hearth furnace 20. If the quantity of water vapor conveyed by a line 72 is not sufficient for activation, water can optionally be added to the boiler via line 74 to provide additional water vapor.

The boiler 64 additionally includes a heat exchange means to convey the hot gases from the afterburner via line 65 and bring the hot gases into indirect heat-exchange relationship with the oil passing through the boiler via lines 76 and 78 and with the water vapor passing through lines 72 and 56. The gases leaving the boiler 64 are conveyed via line 67 to a scrubber 66 for removal of particulate material before the gases are discharged to the atmosphere via line 69.

In operation of the system illustrated in FIG. 2, carbon is introduced into the dewatering screw 60 to separate some water therefrom. Thereafter the spent carbon is transferred to the thermal screw 62 and heated therein by oil passing through lines 76 and 78. The water vapor evolved from the carbon is conveyed via line 72 to the boiler 64 for heating and thereafter conveyed to the inlet pipes 44.

Figure 3:
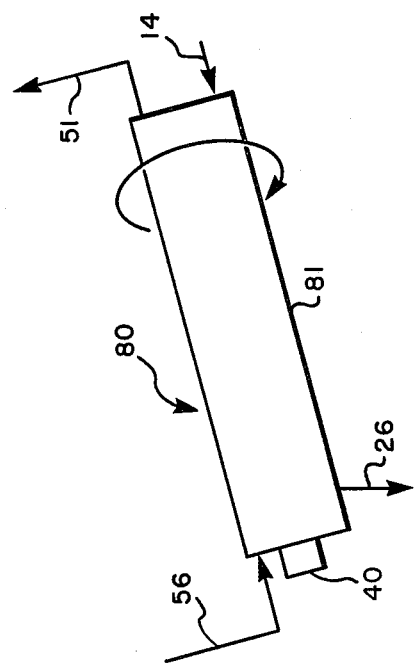
FIG. 3 is a schematic illustration of part of a third embodiment of the present system.

It should be understood that other known devices can be substituted for the multiple heath furnace 20, For example, the system illustrated in FIG. 3 includes a rotary kiln 80 to contain spent activated carbon for regeneration. The rotary kiln is a conventional means including a rotating cylinder 81 to contain material and to bring the material in contact with hot fluids. The rotary kiln 80 includes inlet means to receive the spent carbon via line 14 and outlet means to discharge carbon via line 26. The rotary kiln 80 further includes means to receive water vapor via line 56 and means to exhaust gases via line 51. A conventional burner 40 is coupled to the end of the rotary kiln 80 to provide heat. In operation, dried spent carbon is introduced into the kiln 80 via line 14, and the kiln rotates so that the carbon tumbles through to the opposite end. Fuel is burned in burner 40 to heat the carbon, and water vapor from the drying means 10 is transferred via line 56 into the kiln 80. Thus the carbon is reactivated as it tumbles through the kiln.

We claim:

1. A process for reactivating wet spent activated carbon, in a furnace having at least a baking zone and a reactivating zone comprising:
   a. heating the wet spent activated carbon in a drying means to drive off water as steam;
   b. thereafter removing volatile organic chemicals by baking the carbon in a passing stream of gas in the baking zone to drive off the volatile organic chemicals and carry the chemicals out in the stream of gas;
   c. transferring steam which was evolved from the wet spent activated carbon to the reactivating zone;
   d. reactivating the baked carbon in the reactivating zone in the presence of the steam substantially all of which was evolved from the wet spent activated carbon in the drying means;
   e. transferring the gas containing volatile organic chemicals from the baking zone to an afterburner to burn the chemicals;
   f. removing hot gas from the afterburner and bringing the gas into heat exchange relationship with the wet spent activated carbon in the drying means to heat and dry the wet spent activated carbon and simultaneously provide a source of steam for reactivation of the spent activated carbon.

2. The process of claim 1 wherein the wet spent activated carbon introduced into the drying means contains about 40%–60% water.

3. The process of claim 2 wherein the carbon from the drying means contains about 1%–20% water immediately prior to baking.

4. The process of claim 1 wherein the steam which was evolved from the wet carbon is passed through heating means prior to introducing the heated steam into the reactivating means.

5. The process of claim 1 wherein only part of the hot gas from the afterburner is brought into heat exchange relationship with the wet spent activated carbon.

* * * * *